No. 876,193. PATENTED JAN. 7, 1908.
E. W. KAPP.
WAVE MOTOR.
APPLICATION FILED APR. 30, 1907.

3 SHEETS—SHEET 1.

Witnesses.
O. W. Bryant
J. E. Brown

Inventor.
Eli Wilson Kapp

No. 876,193.
PATENTED JAN. 7, 1908.
E. W. KAPP.
WAVE MOTOR.
APPLICATION FILED APR. 30, 1907.
3 SHEETS—SHEET 2.
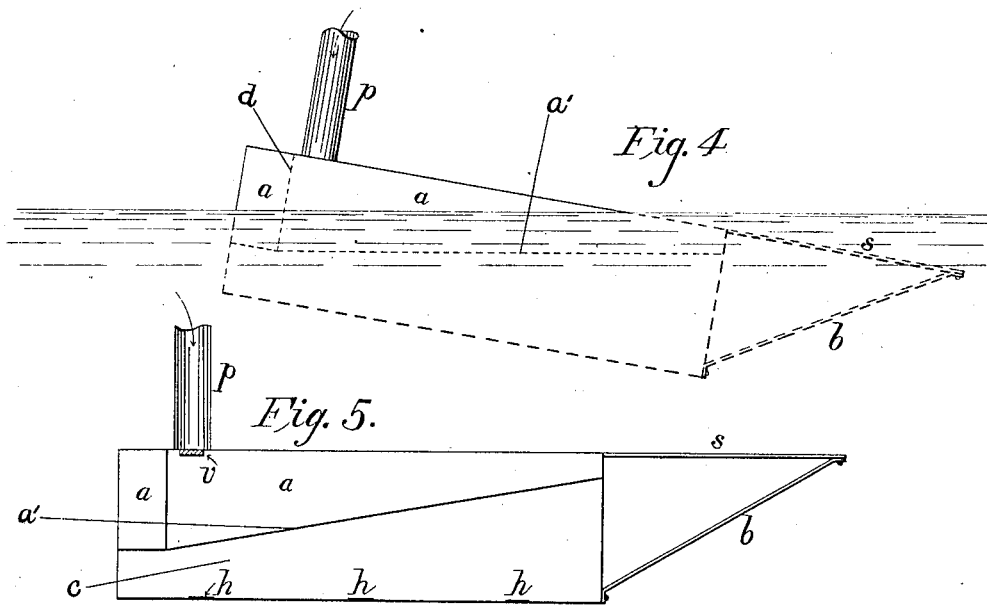
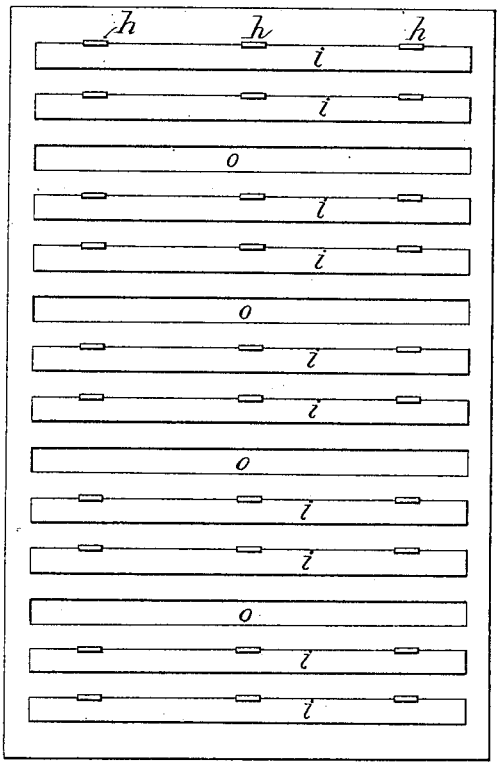
Witnesses.
O. W. Bryant
J. E. Brown
Inventor:
Eli Wilson Kapp No. 876,193.

E. W. KAPP.
WAVE MOTOR.
APPLICATION FILED APR. 30, 1907.

PATENTED JAN. 7, 1908.

3 SHEETS—SHEET 3.

Witnesses
O. W. Bryant
J. E. Brown

Inventor.
Eli Wilson Kapp

UNITED STATES PATENT OFFICE.

ELI WILSON KAPP, OF LOS ANGELES, CALIFORNIA.

WAVE-MOTOR.

No. 876,193.  Specification of Letters Patent.  Patented Jan. 7, 1908.

Application filed April 30, 1907. Serial No. 371,150.

*To all whom it may concern:*

Be it known that I, ELI WILSON KAPP, a citizen of the United States, residing at Los Angeles, in the county of Los Angeles and State of California, have invented certain new and useful Improvements in Wave-Motors, of which the following is a specification.

My invention relates to wave motors of that class which are adapted to be forced beneath the surface of the water to compress air admitted to the motor, which compressed air may be utilized for power purposes.

To this end my invention is embodied in preferable form in the wave motor hereinafter described and illustrated in the accompanying drawings.

Figure 1:
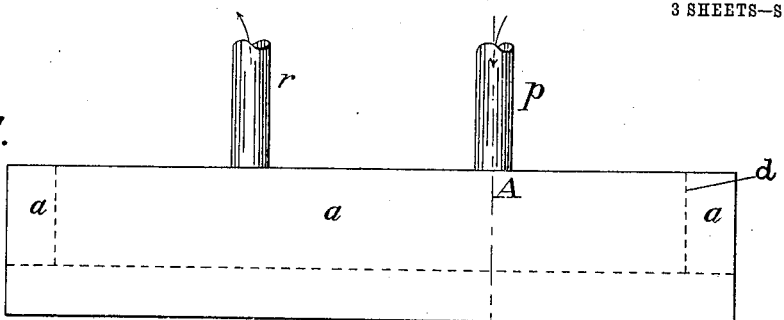
Figure 2:
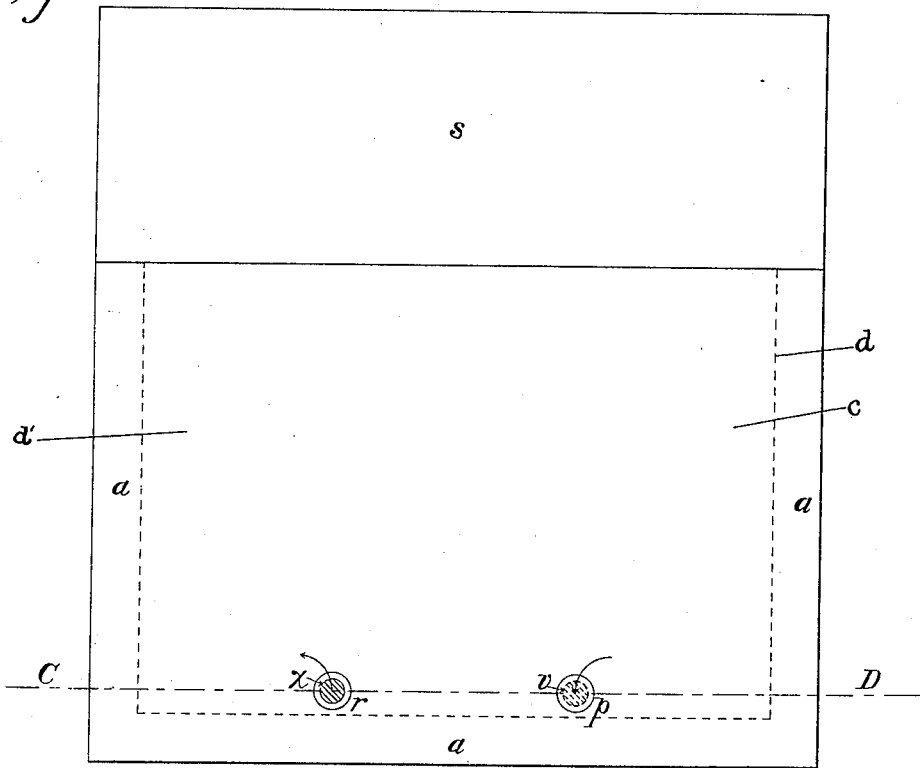
Figure 3:
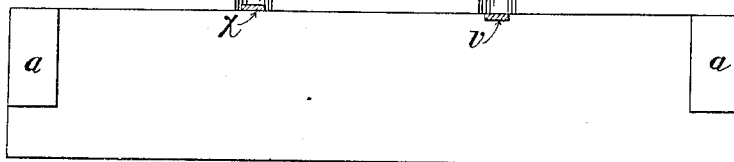
Figure 7:
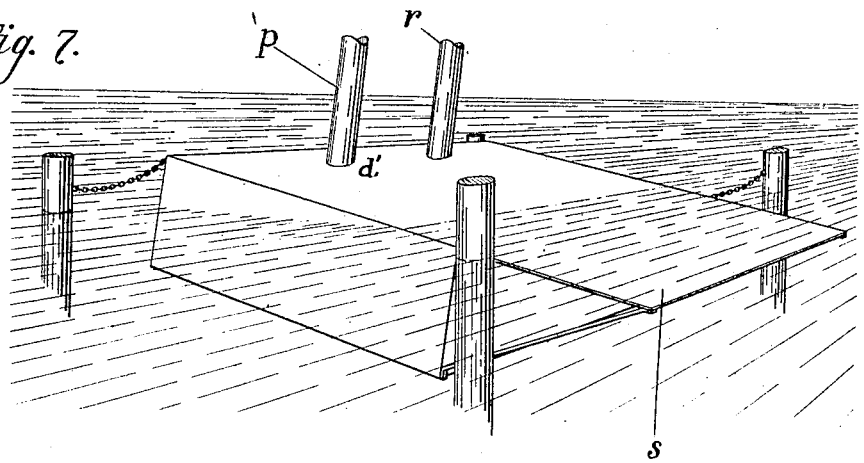
Figure 8:
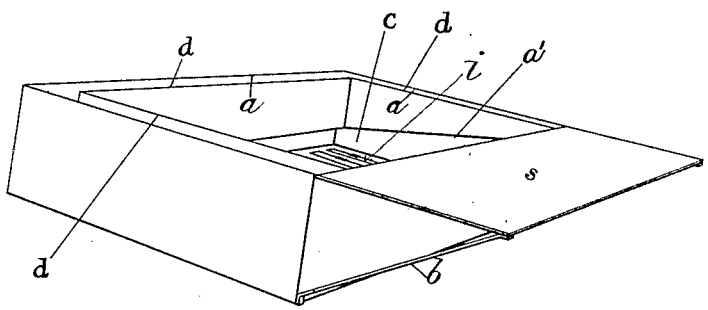

In these drawings, Figure 1 is a front elevation of my improved wave motor; Fig. 2, a top plan view thereof; Fig. 3, a sectional view, section being taken through the line C—D of Fig. 2; Fig. 4, a side elevation of the motor; Fig. 5, a sectional view, section being taken through the line A—B of Fig. 1; Fig. 6, a plan view of the bottom of the motor taken on the inside; Fig. 7, a perspective view of the motor in working position and secured to piles by means of anchor chains, and Fig. 8, a perspective view of the motor with the top cover-plate removed.

Similar letters refer to similar parts throughout the entire drawings and specification.

Referring to the drawings, $a$ is a closed buoy chamber which is stored with air so as to support the motor upon the surface of the water. The bottom of this air chamber along the ends is inclined obliquely as at $a^1$ which causes the wave motor to be tilted when on the surface of the water as shown in Fig. 4. The buoy chamber is only for the purpose of floating the motor.

Formed by the three inner walls $d$ of the buoy chamber, the end wall of the body of the motor and the cover $d^1$ is an air chamber $c$.

Communicating with the air chamber $c$ is an air intake pipe $p$ to admit air to the chamber $c$ upon the submersion of the floating motor into the water. This air intake pipe is provided with a valve $v$ which will be opened downward by the force of the air on its passage to the air chamber and returned to closed position by the pressure in chamber $c$. An air discharge pipe $r$ also communicates with the air chamber and is adapted to lead the air from chamber $c$ to a suitable storage tank (not shown) from which the compressed air may be drawn for power utilization. This pipe is also provided with an upwardly opening valve $x$, to permit the passage of air to the tank but to prevent its return. A continuation of the top plate $d^1$ of the motor projects over and beyond the side of the motor to form a platform $s$ adapted to receive the waves. This platform $s$ is provided with braces $b$, secured to both the platform and the body of the motor.

The bottom of the chamber $c$ of the motor has a series of openings $o$ running from side to side throughout the entire length of the motor to permit the water to enter and leave the air chamber upon the submersion of the motor into the water and its rising action. Valves run parallel with and border each side of each of the openings $o$ so as to allow the water to enter and to check the outward flow so as to prevent a too sudden rebound of the motor, whereby the time of the air compressing stroke is prolonged. These valves $i$ open inwardly so as to permit of the entrance of water and are also pivoted on hinges $h$.

The wave motor is preferably rectangular in shape and is constructed of any suitable material commonly employed in a device of this kind.

The operation is as follows: The motor is anchored so as to receive the waves on the platform $s$. The waves strike the platform thus submerging the motor beneath the surface of the water. By this submersion, water enters the air chamber $c$ through the openings $o$ and the openings closed by the valves $i$. By this sudden rush of water into the chamber, the air in the chamber is compressed and the valve $x$ in the air discharge pipe opens and allows the air to pass through the discharge pipe to the storage tank. When the wave has passed over the motor the motor is lifted to the surface of the water by the buoy chamber $a$, air enters the intake pipe $p$ and the motor is then in position to receive the next wave.

Having thus described my invention what I claim is:

1. A floating wave motor the bottom of which is provided with a series of openings to permit of the entrance and discharge of water upon the submersion into, and rise of the motor from the water, respectively, substantially as described.

2. A wave motor the bottom of which is provided with a series of openings and a series of check-valves to permit of the entrance of water upon the submersion of the motor under the water, said valves permitting of the motor rising and falling evenly in the water, substantially as described.

3. A wave motor having a platform formed by the continuation of the top beyond the end of the motor, substantially as described.

4. A wave motor having an air chamber open to the water and formed by the top and walls of the motor and having buoy chamber partitions separating said air chamber from the buoy chamber, whereby upon the submersion and rise of the motor in the water a compression of air is caused, substantially as described.

5. A wave motor consisting of a floating body having a buoying chamber, and having an air compressing chamber, and having an opening in the bottom of said air compressing chamber for the admission and escape of the water on the fall and rise of the floating body, an air intake pipe and an air outlet pipe communicating with said air compressing chamber, and check valves in said pipes, substantially as described.

6. A wave motor having a platform adapted to receive the waves, said wave motor adapted to be submerged beneath the surface of the water, thereby causing a current of air in the air chamber, an air intake pipe adapted to lead air from the surface of the water to the air chamber, a controlling valve in said air intake pipe, an air discharge pipe through which the current of air is adapted to be led to a suitable storage tank, a controlling valve in said air discharge pipe, substantially as described.

7. A wave motor adapted to submerge under the surface of the water upon the contact of a wave with the platform, the weight of said waves adapted to hold the motor beneath the surface of the water, said motor adapted to rise to the surface of the water by means of the buoy chamber upon the passing of a wave over the top of the motor, substantially as described.

8. A wave motor provided with a closed air chamber to buoy the motor, and provided with an inclined bottom for said chamber whereby the motor will be floated in a tilted position, substantially as described.

In testimony whereof I have affixed my signature, in presence of two witnesses.

ELI WILSON KAPP.

Witnesses:
JOHN FOHL. KUHNS,
JOHN KAPP.